(12) United States Patent
Chen

(10) Patent No.: US 8,960,618 B2
(45) Date of Patent: Feb. 24, 2015

(54) DETACHABLE HANGER AND SUPPORTING STAND WITH HANGER

(75) Inventor: Wei-Chieh Chen, Taoyuan County (TW)

(73) Assignee: BenQ Corporation, Taipei (TW)

(*) Notice: Subject to any disclaimer, the term of this patent is extended or adjusted under 35 U.S.C. 154(b) by 268 days.

(21) Appl. No.: 13/555,200

(22) Filed: Jul. 23, 2012

(65) Prior Publication Data

US 2013/0062488 A1 Mar. 14, 2013

(30) Foreign Application Priority Data

Sep. 9, 2011 (TW) .............................. 100132665 A

(51) Int. Cl.
*A47B 96/00* (2006.01)
*F16M 13/02* (2006.01)
*F16M 11/04* (2006.01)

(52) U.S. Cl.
CPC ............. *F16M 13/02* (2013.01); *F16M 11/041* (2013.01); *Y10S 248/919* (2013.01)
USPC ................... 248/222.51; 248/121; 248/231.9; 248/292.12; 248/919; 361/679.21

(58) Field of Classification Search
CPC ............................ F16M 13/02; F16M 11/041
USPC ........... 248/121, 158, 176.1, 222.14, 222.51, 248/222.52, 223.31, 231.9, 292.12, 301, 248/304, 918; 361/679.21–679.25
See application file for complete search history.

(56) References Cited

U.S. PATENT DOCUMENTS

| | | | | |
|---|---|---|---|---|
| 414,961 A * | 11/1889 | Wilson | ..................... | 248/292.12 |
| 436,717 A * | 9/1890 | Moore | ......................... | 379/454 |
| 450,250 A * | 4/1891 | Nacke | ....................... | 248/125.3 |
| 473,919 A * | 5/1892 | Edsall | ..................... | 248/292.12 |
| 4,527,760 A * | 7/1985 | Salacuse | ...................... | 248/108 |
| 4,599,768 A | 7/1986 | Doyle | | |
| 7,909,295 B2 * | 3/2011 | Powers et al. | ................. | 248/121 |
| 2010/0141864 A1* | 6/2010 | Lai | .................................. | 349/58 |
| 2013/0153723 A1* | 6/2013 | Nichols et al. | ............ | 248/222.11 |

FOREIGN PATENT DOCUMENTS

| | | |
|---|---|---|
| CN | 201531513 U | 7/2010 |
| TW | M351960 | 3/2009 |
| TW | M354684 | 4/2009 |
| TW | M395745 | 1/2011 |

* cited by examiner

*Primary Examiner* — Gwendolyn W Baxter

(57) ABSTRACT

A detachable hanger and a supporting stand with the detachable hanger are disclosed. The supporting stand includes a mount, a support member, an object-fixing structure, and the detachable hanger. The support member is disposed on the mount and includes an engagement structure. The object-fixing structure is disposed on the support member for fixing an object. The detachable hanger includes a hanger part and an engagement part. The engagement part is connected to the hanger part and engaged with the engagement structure in a rotary way. Thereby, the detachable hanger can be detached for storage of the supporting stand; when the supporting stand needs to be used again, the detachable hanger can be engaged onto the support member simply and firmly. Therefore, the invention solves the problem of the inconvenient storage for a conventional supporting stand with an undetachable hanger.

17 Claims, 11 Drawing Sheets

DETACHABLE HANGER AND SUPPORTING STAND WITH HANGER

BACKGROUND OF THE INVENTION

1. Field of the Invention

The invention relates to a supporting stand and a hanger for supporting stand, and especially relates to a supporting stand with hanger and a detachable hanger for supporting stand.

2. Description of the Prior Art

An LCD monitor for desktop computer is usually fixed by a supporting stand, which generally only provides supporting the monitor. As multimedia applications develop, users prefer wearing a headphone. The headphone has a certain volume, leading to a load on the storage therefor. In a practical application, when the headphone is not in use, the headphone is usually put on a table or a computer host, even or is hanged obliquely on an upper corner of the monitor. However, putting the headphone on the table makes the table chaotic. The headphone put on the computer host falls down easily due to an impact. The headphone is hardly fixed just by being put on the monitor, leading to falling on the table easily. Furthermore, hanging the headphone on the monitor may make the monitor shake slightly; after the hanging, the headphone covers a portion of the screen of the monitor. For this issue, some monitors on sale are equipped with a fixed hanger on the frame thereof for a headphone or other object to hang thereon. However, the fixed hanger is protrusive to the casing of the monitor, which is inconvenient to store the whole displaying equipment (including the monitor and the supporting stand). Moreover, hanging the headphone on the fixed hanger disposed on the frame of the monitor still may make the monitor shake slightly.

SUMMARY OF THE INVENTION

An objective of the invention is to provide a detachable hanger. A user can easily attach the detachable hanger onto a supporting stand for hanging an object such as a headphone, or can easily detach the detachable hanger from the supporting stand for conveniently storing the supporting stand.

The detachable hanger of the invention is used for a supporting stand. The supporting stand includes a support member. The support member has an engagement structure. The detachable hanger includes a hanger part and an engagement part. The engagement part is connected to the hanger part and engaged with the engagement structure in a rotary way. Thereby, a user can easily install the detachable hanger on the supporting stand, and an object hanged on the detachable hanger will not affect other objects fixed on the supporting stand, such as monitor. Furthermore, if the supporting stand needs to be stored, the user also can easily detach the detachable hanger from the supporting stand without any extra tool. Therefore, the detachable hanger of the invention can solve the problems in the prior art that the conventional fixed hanger cannot be removed and hanging an object on the fixed hanger may make the monitor (also fixed on the supporting stand) shake.

Another objective of the invention is to provide a supporting stand having the detachable hanger of the invention. Therefore, a user can easily attach the detachable hanger onto the supporting stand for hanging an object such as a headphone, or can easily detach the detachable hanger from the supporting stand for conveniently storing the supporting stand.

The supporting stand with hanger of the invention includes a mount, a support member, an object-fixing structure, and a detachable hanger. The support member is disposed on the mount and has an engagement structure. The object-fixing structure is disposed on the support member for fixing an object, such as a monitor. The detachable hanger includes a hanger part and an engagement part. The engagement part is connected to the hanger part and is engaged with the engagement structure in a rotary way. Similarly, the user can easily install the detachable hanger on the supporting stand, and an object hanged on the detachable hanger will not affect the monitor. If the supporting stand needs to be stored, the also can easily detached the detachable hanger from the supporting stand without any extra tool. Therefore, the supporting stand with hanger of the invention can solve the problem in the prior art that it is inconvenient to store the conventional displaying equipment with fixed hanger because the fixed hanger cannot be removed or is difficult to be removed, and the problem that hanging an object on the fixed hanger disposed on the casing of the monitor of the displaying equipment may easily make the monitor shake.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
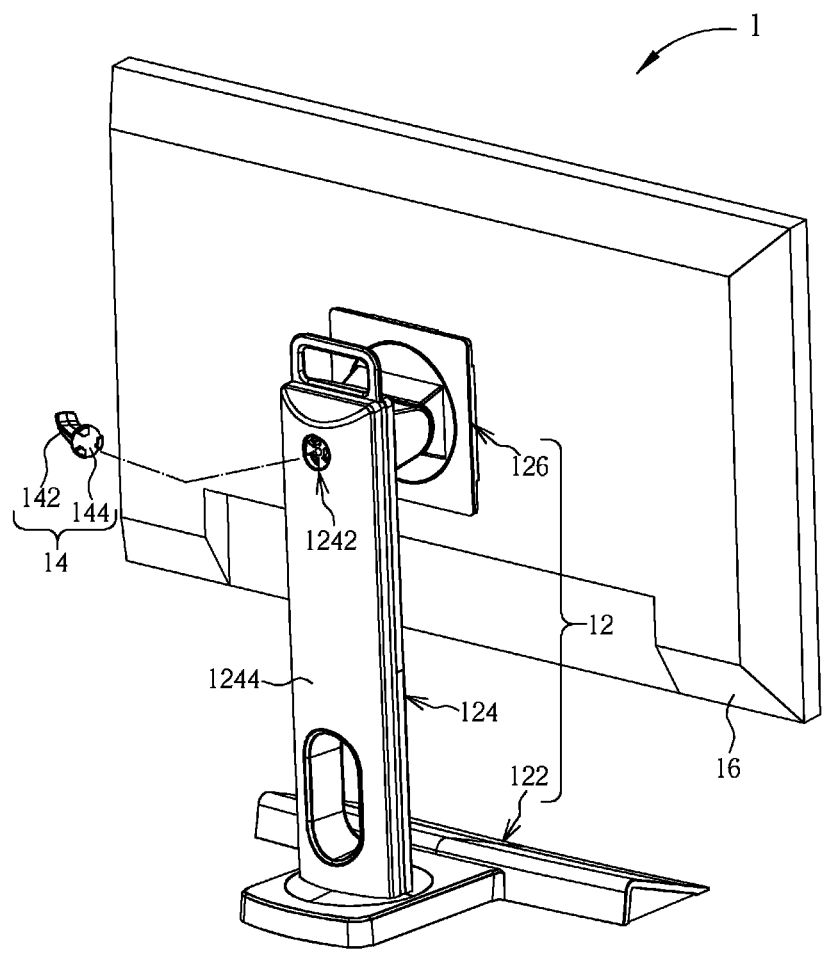
FIG. 1 is a schematic diagram illustrating a displaying equipment of a preferred embodiment according to the invention.

Please refer to FIG. 1, which is a schematic diagram illustrating a displaying equipment 1 of a preferred embodiment according to the invention. The displaying equipment 1 includes a supporting stand 12, a detachable hanger 14 installed on the supporting frame 12, a monitor 16 fixed on the supporting frame 12. Therein, the detachable hanger 14 and the supporting stand 12 are shown apart in FIG. 1 so as to illustrate engagement structures therefor. The supporting stand 12 with the detachable hanger 14 is an instance of the supporting stand with hanger of the invention. The supporting stand 12 includes a mount 122, a support member 124, and an object-fixing structure 126. The support member 124 is disposed on the mount 122 and has an engagement structure 1242. The object-fixing structure 126 is disposed opposite to the engagement structure 1242 on the support member 124. The monitor 16 is fixed on the supporting stand 12 by the object-fixing structure 126. The object-fixing structure 126 generally has an adjustment function for disposing the monitor 16 in various angles. The detachable hanger includes a hanger part 142 and an engagement part 144. The engagement part 144 is connected to the hanger part 142 and is engaged with the engagement structure 1242 in a rotary way. Thereby, the detachable hanger 14 is capable of being detached from the support member 124 for the convenience of storing the displaying equipment 1.

Figure 2:
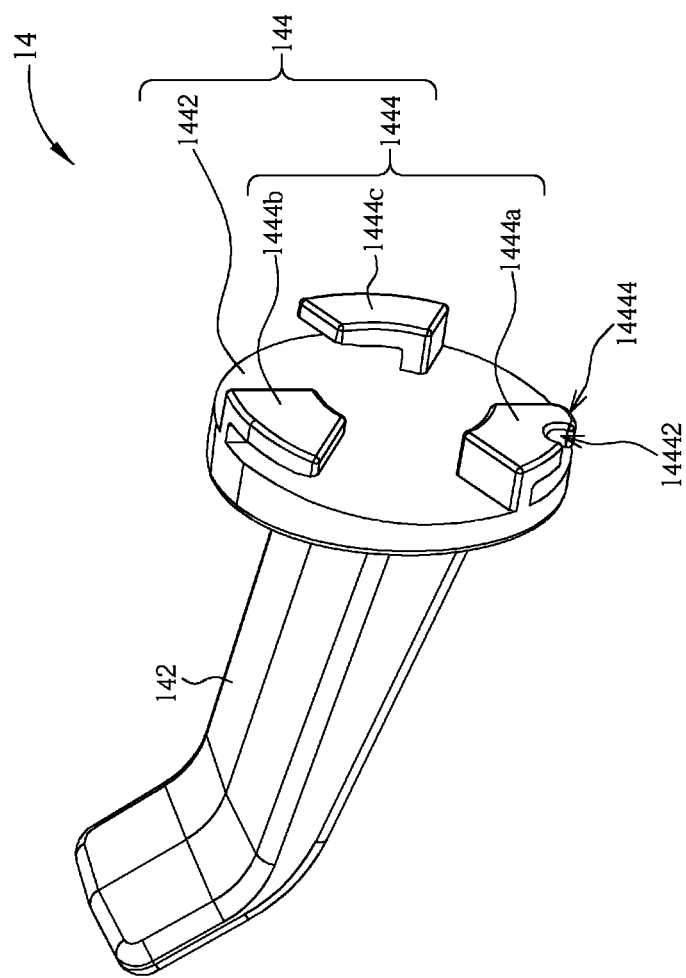
FIG. 2 is a schematic diagram illustrating a detachable hanger in FIG. 1.

Please refer to FIG. 2, which is a schematic diagram illustrating the detachable hanger 14. The engagement part 144 includes a base portion 1442 and three locking portions 1444a, 1444b and 1444c disposed on the base portion 1442. The hanger part 142 is opposite to the locking portions 1444a, 1444b and 1444c to be connected to the base portion 1442. In the embodiment, the detachable hanger 14 is formed in one piece, but the invention is not limited thereto. Furthermore, in the embodiment, the base portion 1442 is provided in circular plate. The three locking portions 1444a, 1444b and 1444c are fixedly disposed on the base portion 1442 in a trisection of the circle, so that the engagement force of the engagement part 144 and the engagement structure 1242 is more balanced; however, the invention is not limited thereto.

Figure 3:
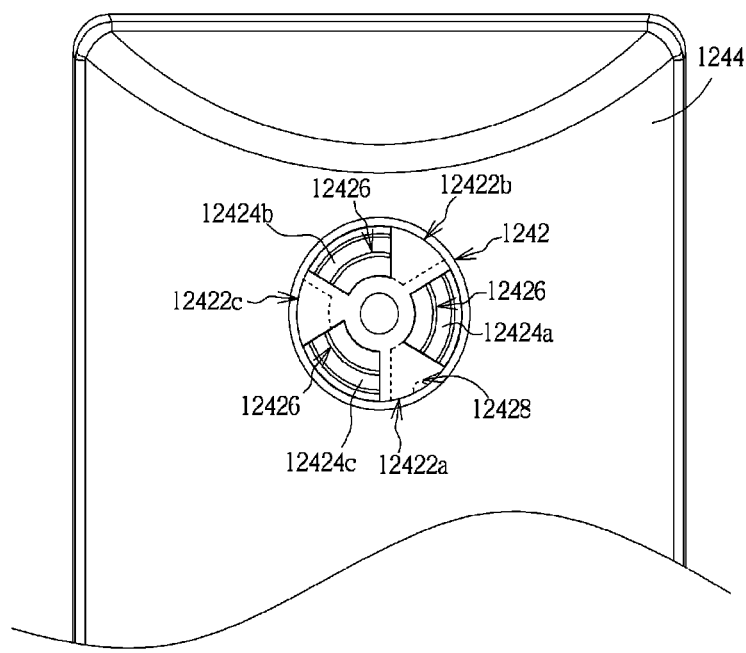
FIG. 3 is a front view of a portion of a back cover of a support member in FIG. 1.
Figure 4:
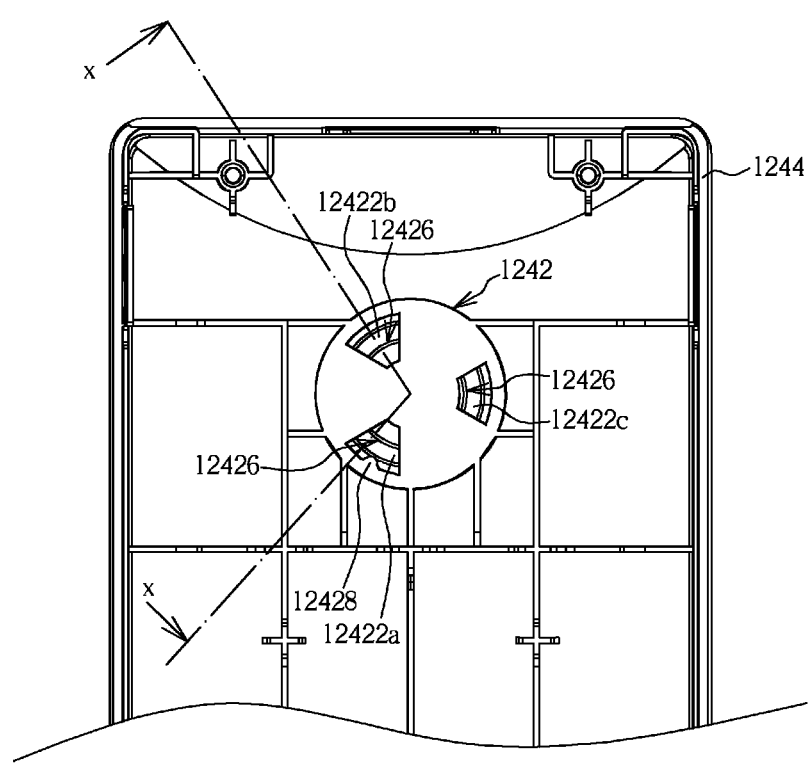
FIG. 4 is a rear view of the portion of the back cover of the support member in FIG. 1.
Figure 5:
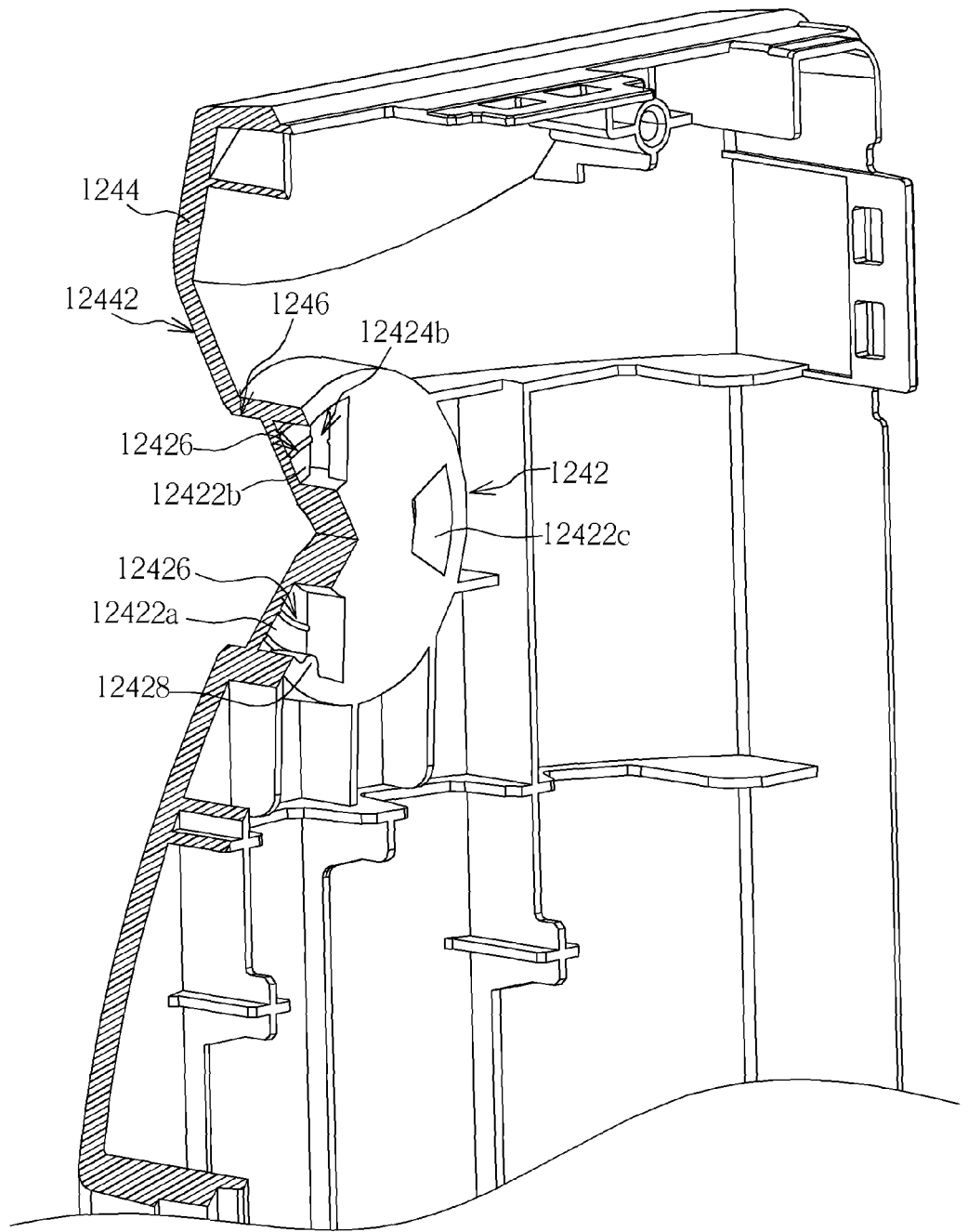
FIG. 5 is a schematic diagram illustrating the back cover of the support member in FIG. 4 with being partially sectioned.

Please refer to FIGS. 3 through 5 together. FIG. 3 is a front view of a portion of a back cover 1244 of the support member 124. FIG. 4 is a rear view of the portion of the back cover 1244 of the support member 124; therein, the view point thereof is inside the support member 124. FIG. 5 is a schematic diagram illustrating the back cover 1244 of the support member 124 with being partially sectioned; the cutting position is shown as the line X-X in FIG. 4. The engagement structure 1242 has three locking portions 12422a, 12422b and 12422c (shown by dashed lines in FIG. 3) and three passages 12424a, 12424b and 12424c formed beside the locking portions 12422a, 12422b and 12422c respectively. Thereby, the locking portions 1444a, 1444b and 1444c of the engagement part 144 of the detachable hanger 14 can pass through the passages 12424a, 12424b and 12424c to be engaged with the locking portions 12422a, 12422b and 12422c respectively. It is added that the engagement structure 1242 is provided with ribs 12426 formed on the walls of the locking portions 12422a, 12422b and 12422c and the passages 12424a, 12424b and 12424c. It is conducive to avoiding jam between the locking portions 1444a, 1444b and 1444c of the engagement part 144 with the engagement structure 1242, or avoiding inducing excessive friction force during a rotation of the engagement part 144, which is inconvenient to installation by hand. However, the invention is not limited thereto.

In the embodiment, for the enhancement of the engagement stability of the detachable hanger 14 with the support member 124, the locking portion 1444a has a positioning recess 14442, and the engagement structure 1242 has a positioning pillar 12428 at the locking portion 12422a. When the locking portion 1444a is engaged with the locking portion 12422a, the positioning pillar 12428 is locked in the positioning recess 14442. In practice, a user can have a positioning feeling and judge whether the engagement is completed thereby. Furthermore, the locking portion 1444a forms a chamfer structure 14444 at its front portion so that the positioning pillar 12428 can smoothly slide into the positioning recess 14442. In other words, the locking portions 1444b and 1444c are hardly engaged with the locking portion 12422a because of the absence of the chamfer structure 14444. Therefore, the positioning pillar 12428 also has a fool-proof effect. In addition, the cross section of the passages 12424a, 12424b and 12424c is suitable to be larger than or substantially equal to the profile of the corresponding locking portions 1444a, 1444b and 1444c, so that the locking portions 1444a, 1444b and 1444c can smoothly slide into the passages 12424a, 12424b and 12424c. It is added that in the embodiment, the locking portion 1444c has a thinner and longer appearance than the other locking portions 1444a and 1444b. The cross section of the passage 12424c is obviously larger than the profile of the locking portion 1444c, while the profile of the locking portion 12422c is equal to the profile of the locking portion 1444c; therefore, the fool-proof effect still functions here. In practice, the cross section of the passage 12424c can be reduced to be substantially equal to the profile of the locking portion 1444c, as shown by dashed lines in FIG. 3.

Figure 6:
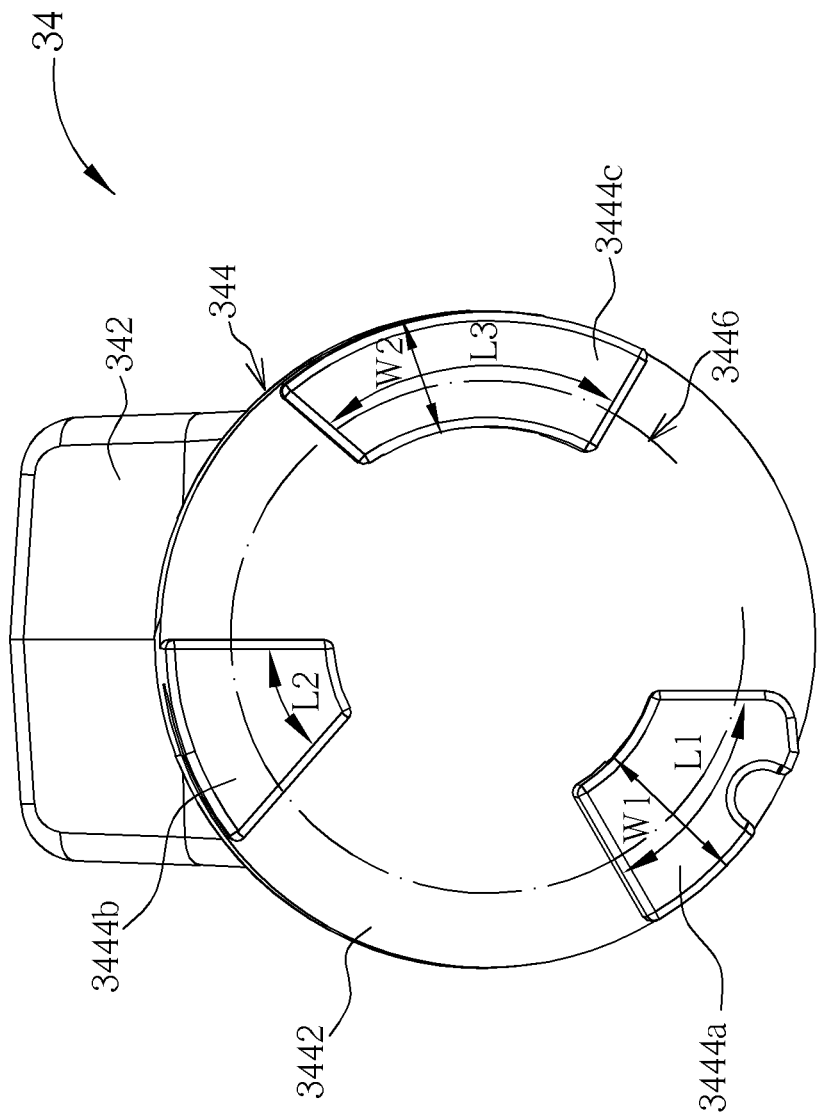
FIG. 6 is a front view of a detachable hanger according to another embodiment.

As discussed above, in principle, the locking portions 12422a, 12422b and 12422c of the engagement structure 1242 are usually designed in coordination with the structures of the locking portions 1444a, 1444b and 1444c of the detachable hanger 14, so the structures of the locking portions 1444a, 1444b and 1444c are designed to be different in practice, leading to fool-proof effect. Please refer to FIG. 6, which is a front view of a detachable hanger 34 according to another embodiment. In the embodiment, the detachable hanger 34 is similar in structure to the detachable hanger 14. The detachable hanger 34 also includes a hanger part 342 and an engagement part 344. The main difference is that locking portions 3444a, 3444b and 3444c of the engagement part 344 have different extension lengths. Similarly, the locking portions of the engagement structure matching with the locking portions 3444a, 3444b and 3444c are modified to have different extension lengths correspondingly, which is not additionally described herein. For simple illustration, the base portion 3442 thereon defines an arc 3446. The locking portions 3444a, 3444b and 3444c extend along the arc 3446 and have different lengths L1, L2 and L3 respectively. Therefore, the detachable hanger 34 can perform fool-proof effect by the difference between the lengths L1, L2 and L3. It is added that in principle, it is sufficient for the fool-proof effect that one of the locking portions 3444a, 3444b and 3444c has a different length from others. In addition, the locking portions 3444a and 3444c of the detachable hanger 34 in FIG. 1 have different widths W1 and W2 along the arc 3446 respectively. Similarly, the detachable hanger 34 can also perform the fool-proof effect by the difference between the widths W1 and W2.

Figure 7:
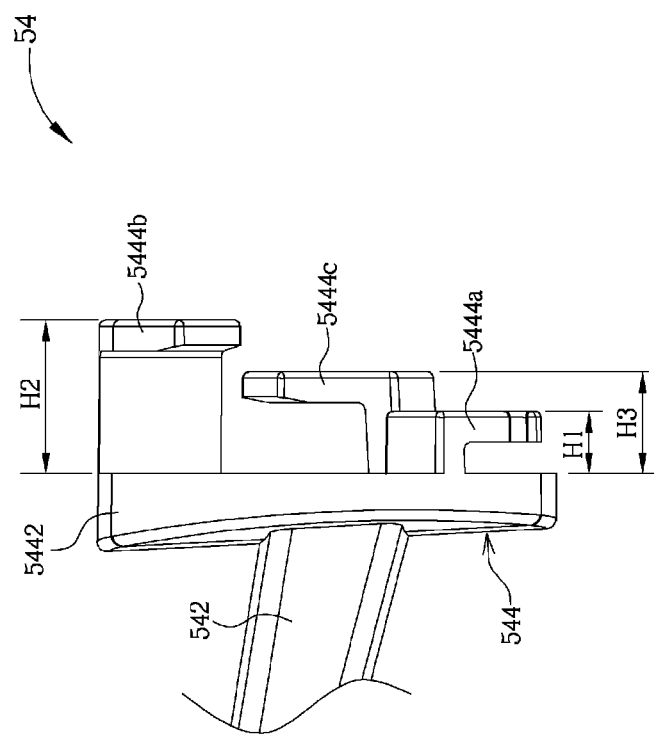
FIG. 7 is a side view of a detachable hanger according to another embodiment.

Please refer to FIG. 7, which is a side view of a detachable hanger 54 according to another embodiment. In the embodiment, the detachable hanger 54 is similar in structure to the detachable hanger 14. The detachable hanger 54 also includes a hanger part 542 and an engagement part 544. The main difference is that the locking portions 5444a, 5444b and 5444c of the engagement part 544 have different protrusive heights. Similarly, the locking portions of the engagement structure matching with the locking portions 5444a, 5444b and 5444c are modified to have different protrusive heights correspondingly, which is not additionally described herein. The locking portions 5444a, 5444b and 5444c of the engagement part 544 have different heights H1, H2 and H3 relative to the base portion 5442 respectively. Therefore, the detachable hanger 54 can perform the fool-proof effect by the difference between the heights H1, H2 and H3. Similarly, in principle, it is sufficient for the fool-proof effect that one of the locking portions 5444a, 5444b and 5444c has a different height from others. In the above embodiments, all the locking portions are provided on the above fool-proof designs; in a practical application, it is acceptable that one or more of the fool-proof designs are applied.

In addition, it is added that in the above embodiments, the engagement structure is provided on a design of sinking structure, for example a recess 1246 on a surface 12442 of the back cover 1244 in FIG. 4. Therefore, when the detachable hanger is engaged with the engagement structure, the engagement part sinks into the recess completely, keeping the smooth appearance of the back cover. In practice, the engagement structure of the invention can be provided on a design of protrusive structure, but the invention is not limited thereto.

Figure 8:
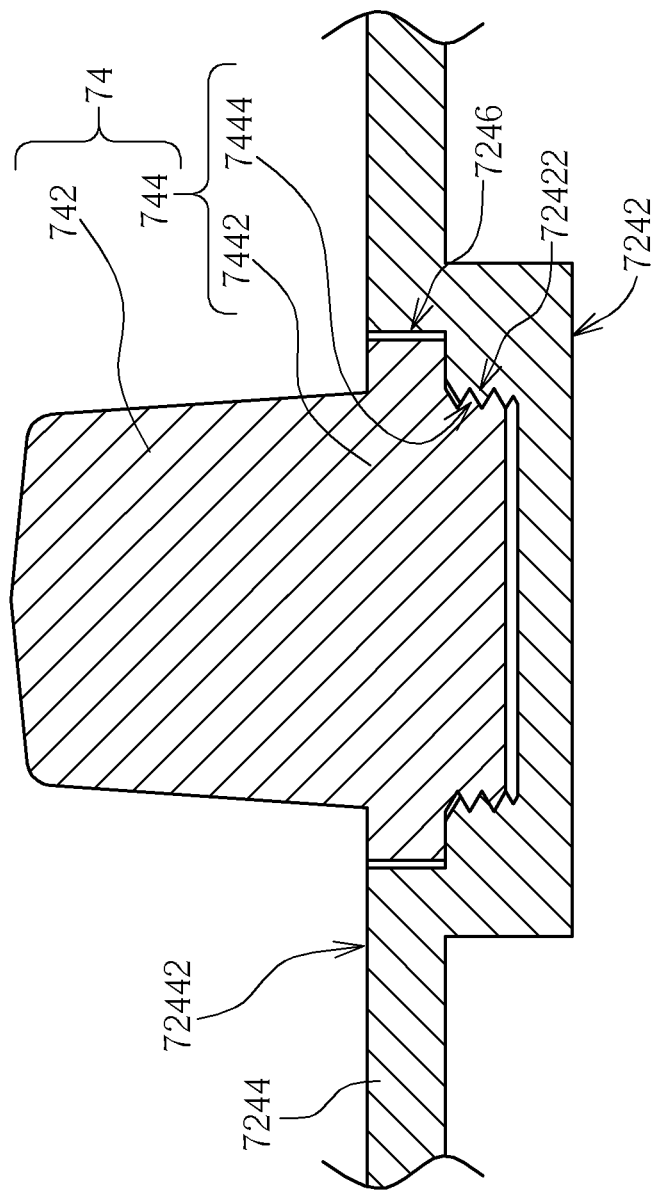
FIG. 8 is a sectional view of a detachable hanger engaged with a back cover of a support member according to another preferred embodiment according to the invention.

Please refer to FIG. 8, which is a sectional view of a detachable hanger 74 engaged with a back cover 7244 of a support member according to another preferred embodiment according to the invention. The detachable hanger 74 is similar in structure to the detachable hangers 14, 34 and 54. The detachable hanger 74 also includes a hanger part 742 and an engagement part 744. The main difference is that the engagement part 744 is engaged with an engagement structure 7242 of the back cover 7244 by thread structure. In the embodiment, the support member has a recess 7246 formed on a surface 72442 formed on the back cover 7244. The engagement structure 7242 is formed in the recess 7246. A male thread structure 7444 is formed on a base portion 7442 of the engagement part 744. The engagement structure 7242 has a female thread structure 72422 matching with the male thread structure 7444. The engagement part 744 sinks into the recess 7246 completely to keep the smooth appearance of the back cover 7244 when the detachable hanger 74 is engaged onto the support member.

Figure 9:
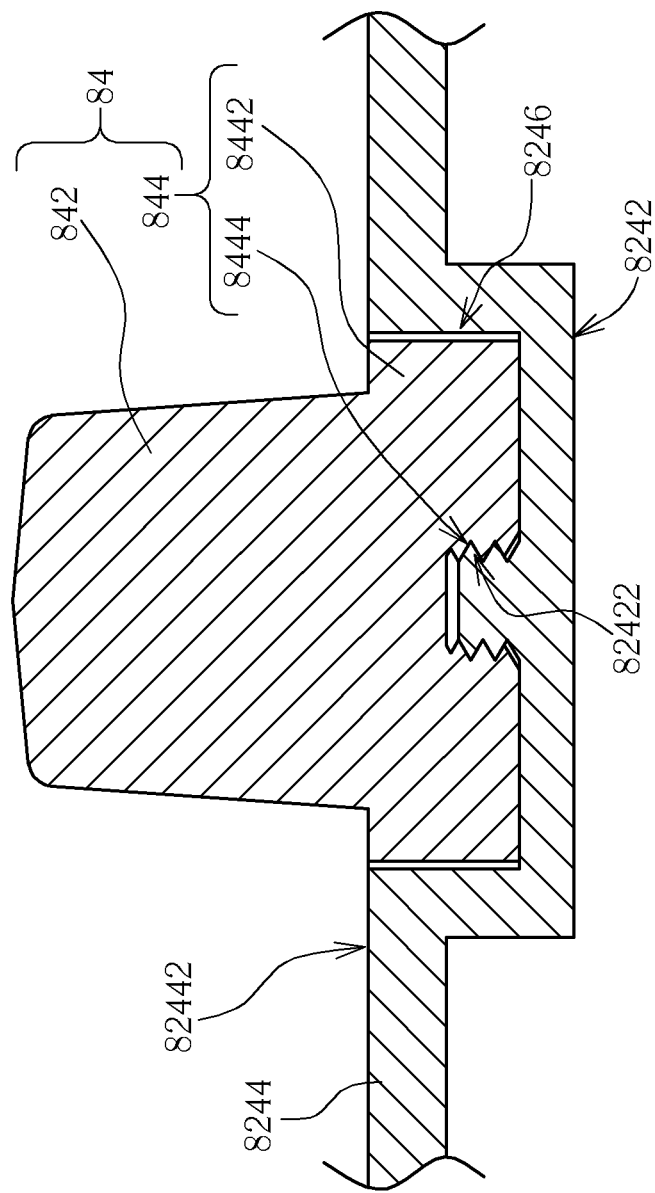
FIG. 9 is a sectional view of a detachable hanger engaged with a back cover of a support member according to another embodiment according to the invention.

Please refer to FIG. 9, which is a sectional view of a detachable hanger 84 engaged with a back cover 8244 of a support member according to another embodiment according to the invention. The detachable hanger 84 is similar in structure to the detachable hanger 74. The detachable hanger 84 also includes a hanger part 842 and an engagement part 844. The engagement part 844 is engaged with an engagement structure 8242 formed on the back cover 8244 by thread structure. The support member has a recess 8246 formed on a surface 82442 of the back cover 8244. The engagement structure 8242 is formed in the recess 8246. The main difference is that a female thread structure 8444 is formed on a base portion 8442 of the engagement part 844, while the engagement structure 8242 has a male thread structure 82422 matching with the female thread structure 8444. The engagement part 844 sinks into the recess 8246 completely to keep the smooth appearance of the back cover 8244 when the detachable hanger 84 is engaged onto the support member.

It is added that in the above embodiments, the engagement length for the thread structures 7444, 72422, 8444 and 82422 is about two pitches. Therefore, if the thread structure is single thread structure, one lead is equal to one pitch, and the detachable hangers 74 and 84 need to be rotated by two circles for the complete engagement. If the thread structure is double thread structure, one lead is equal to two pitches, and the detachable hangers 74 and 84 just need to be rotated by one circle for the complete engagement. In other words, if the thread structure is multiple thread structure with more than two threads, the detachable hangers 74 and 84 can be rotated less than one circle for the complete engagement. That is, the engagement length (i.e. two pitches) is less than one lead, which avoids excessive rotating of the user by hand and maintains the strength of multiple thread structure.

Figure 10:
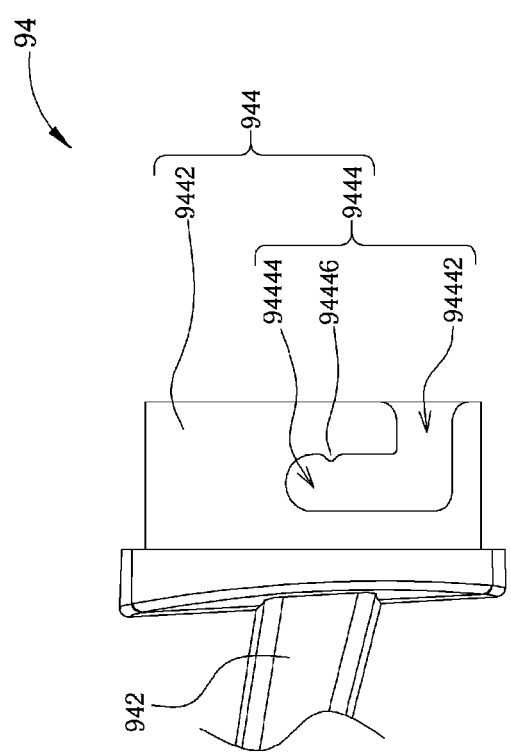
FIG. 10 is a side view of a detachable hanger according to another preferred embodiment of the invention.
Figure 11:
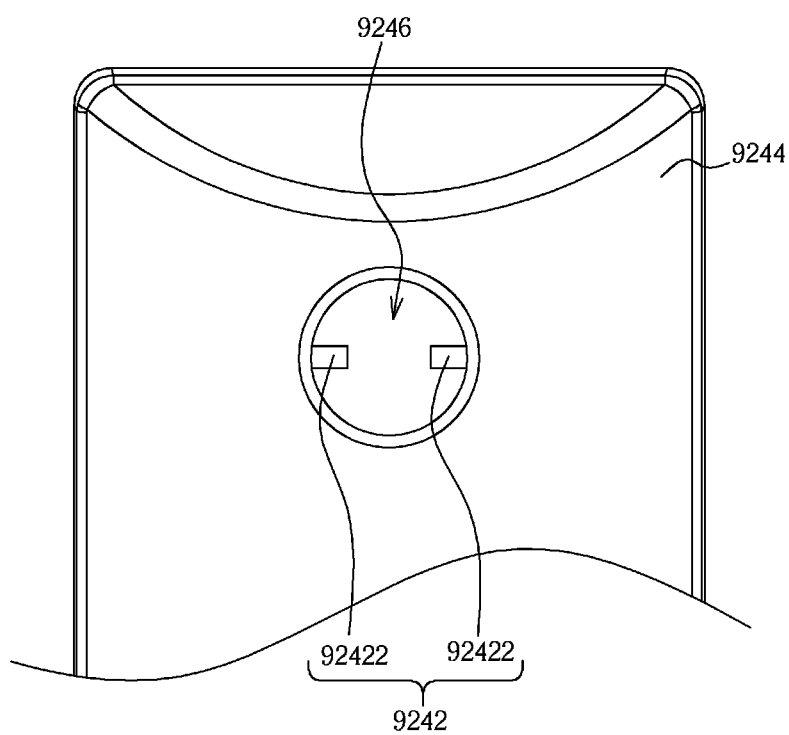
FIG. 11 is a front view of an engagement structure of the detachable hanger in FIG. 10.

Please refer to FIG. 10 and FIG. 11. FIG. 10 is a side view of a detachable hanger 94 according to another preferred embodiment of the invention. FIG. 11 is a front view of an engagement structure 9242 of the detachable hanger 94. The detachable hanger 94 is similar in structure to the detachable hangers 14, 34 and 54. The detachable hanger 94 also includes a hanger part 942 and an engagement part 944. The main difference is that the engagement part 944 is engaged with the engagement structure 9242 formed on a back cover 9244 of the support member by guiding slot and guiding pillar. In the embodiment, the engagement part 944 includes a base portion 9442 and two guiding slots formed on the base portion 9442. The two guiding slots 9444 are oppositely disposed. Because of the limitation by the view of FIG. 10, only one guiding slot 9444 is shown in FIG. 10. The guiding slot 9444 extends in L-shape and has an open end 94442 and a closed end 94444. The back cover 9244 thereon forms a recess 9246. The engagement structure 9242 includes two guiding pillars 92422 oppositely disposed in the recess 9246. During the engagement of the detachable hanger 94 with the engagement structure 9242, the engagement part 944 is inserted into the recess 9246, and the guiding pillars 92422 respectively and simultaneously slide from the open end 94442 of the guiding slot 9444 into the guiding slot 9444 till the closed end 94444 of the guiding slot 9444. In the embodiment, the guiding slot 9444 includes a positioning protrusion 94446 near the closed end 94444, so the guiding pillar 92422 is locked between the closed end 94444 and the positioning protrusion 94446 after sliding to the closed end 94444, which realizes a positioning function. Furthermore, the positioning protrusion 94446 also provides a feeling to the user when the rotation engagement is completed.

As discussed above, compared with the prior art, the invention uses the design of detachable hanger and rotary attachment and detachment, which is conducive to attaching or detaching the hanger by hand and to storing the support member for the user. Furthermore, the detachable hanger of the invention is disposed on the support member, not on the casing of the conventional monitor, so hanging the object (e.g. headphone) on the hanger does not shake or affect other object (e.g. monitor) fixed on the supporting stand.

Therefore, the invention can solve the problem in the prior art that it is inconvenient to store the conventional displaying equipment with fixed hanger because the fixed hanger cannot be removed or is difficult to be removed, the problem that hanging an object on the fixed hanger disposed on the casing of the monitor of the displaying equipment may easily make the monitor shake, and the problem that the object hanged on the fixed hanger covers a portion of the screen of the monitor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable hanger for a supporting stand, the supporting stand comprising a support member, the support member having an engagement structure, the detachable hanger comprising:

a hanger part; and an engagement part connected to the hanger part, the engagement part being engaged with the engagement structure in a rotary way, wherein the engagement part comprises a base portion and a first locking portion and a second locking portion disposed on the base portion, the hanger part is connected to the base portion opposite to the first locking portion and the second locking portion, the engagement structure has a third locking portion, a first passage formed beside the third locking portion, a fourth locking portion, and a second passage formed beside the fourth locking portion, the first locking portion is capable of passing through the first passage to be engaged with the third locking portion, and the second locking portion is capable of passing through the second passage to be engaged with the fourth locking portion.

2. The detachable hanger of claim 1, wherein the first locking portion has a first protrusion height relative to the base portion, the second locking portion has a second protrusion height relative to the base portion, and the first protrusion height is different from the second protrusion height.

3. The detachable hanger of claim 1, wherein the first locking portion has a positioning recess, the engagement structure has a positioning pillar at the third locking portion, and when the first locking portion is engaged with the third locking portion, the positioning pillar is locked in the positioning recess.

4. The detachable hanger of claim 1, wherein the base portion thereon defines an arc, the first locking portion extends along the arc in a first length, the second locking portion extends along the arc in a second length, and the first length is different from the second length.

5. The detachable hanger of claim 1, wherein the base portion thereon defines an arc, the first locking portion extends along the arc and has a first extension width, the second locking portion extends along the arc and has a second extension width, and the first extension width is different from the second extension width.

6. A supporting stand with hanger, comprising:
a mount;
a support member disposed on the mount and having an engagement structure;
an object-fixing structure disposed on the support member for fixing an object; and
a detachable hanger, comprising:
a hanger part; and
an engagement part connected to the hanger part, the engagement part being engaged with the engagement structure in a rotary way, wherein the engagement part comprises a base portion and a first locking portion and a second locking portion disposed on the base portion, the hanger part is connected to the base portion opposite to the first locking portion and the second locking portion, the engagement structure has a third locking portion, a first passage formed beside the third locking portion, a fourth locking portion, and a second passage formed beside the fourth locking portion, the first locking portion is capable of passing through the first passage to be engaged with the third locking portion, and the second locking portion is capable of passing through the second passage to be engaged with the fourth locking portion.

7. The supporting stand of claim 6, wherein a cross section of the first passage substantially matches with a profile of the first locking portion, and a cross section of the second passage substantially matches with a profile of the second locking portion.

8. The supporting stand of claim 6, wherein the first locking portion has a positioning recess, the engagement structure has a positioning pillar at the third locking portion, and when the first locking portion is engaged with the third locking portion, the positioning pillar is locked in the positioning recess.

9. The supporting stand of claim 6, wherein the object-fixing structure is disposed opposite to the engagement structure on the support member.

10. The supporting stand of claim 6, wherein the support member has a surface and a recess formed on the surface, the engagement structure is formed in the recess, and when the detachable hanger is engaged onto the support member, the engagement part sinks into the recess completely.

11. A detachable hanger for a supporting stand, the supporting stand comprising a support member, the support member having an engagement structure, the detachable hanger comprising:
a hanger part; and
an engagement part connected to the hanger part, the engagement part being engaged with the engagement structure in a rotary way, wherein the engagement part comprises a base portion and a first thread structure formed on the base portion, the hanger part is connected to the base portion opposite to the first thread structure, the engagement structure has a second thread structure matching with the first thread structure, the first thread structure and the second thread structure are multiple thread structures, and when the detachable hanger is engaged onto the support member, an engagement length of the first thread structure with the second thread structure is shorter than a lead.

12. A detachable hanger for a supporting stand, the supporting stand comprising a support member, the support member having an engagement structure, the detachable hanger comprising:
a hanger part; and
an engagement part connected to the hanger part, the engagement part being engaged with the engagement structure in a rotary way, wherein the engagement part comprises a base portion, a first guiding slot, and a second guiding slot, the first guiding slot and the second guiding slot are oppositely formed on the base portion, each of the first guiding slot and the second guiding slot extends in L-shape and has an open end and a closed end, the engagement structure comprises a first guiding pillar and a second guiding pillar disposed opposite to the first guiding pillar, and during engaging of the detachable hanger with the engagement structure, the first guiding pillar slides from the open end of the first guiding slot into the first guiding slot till the closed end of the first guiding slot, and the second guiding pillar slides from the open end of the second guiding slot into the second guiding slot till the closed end of the second guiding slot.

13. The detachable hanger of claim 12, wherein the first guiding slot comprises a positioning protrusion near the closed end of the first guiding slot, and when the detachable hanger is engaged onto the support member, the first guiding pillar is engaged between the closed end of the first guiding slot and the positioning protrusion.

14. A supporting stand with hanger, comprising:
a mount;
a support member disposed on the mount and having a surface, a recess formed on the surface, and an engagement structure formed in the recess;
an object-fixing structure disposed on the support member for fixing an object; and
a detachable hanger, comprising:
a hanger part; and
an engagement part connected to the hanger part, the engagement part being engaged with the engagement structure in a rotary way, wherein when the detachable hanger is engaged onto the support member, the engagement part sinks into the recess completely.

15. The supporting stand of claim 14, wherein the engagement part comprises a base portion and a first locking portion and a second locking portion disposed on the base portion, the hanger part is connected to the base portion opposite to the first locking portion and the second locking portion, the engagement structure has a third locking portion, a first passage formed beside the third locking portion, a fourth locking portion, and a second passage formed beside the fourth locking portion, the first locking portion is capable of passing through the first passage to be engaged with the third locking portion, the second locking portion is capable of passing through the second passage to be engaged with the fourth locking portion, a cross section of the first passage substantially matches with a profile of the first locking portion, and a cross section of the second passage substantially matches with a profile of the second locking portion.

16. The supporting stand of claim 14, wherein the engagement part comprises a base portion and a first locking portion and a second locking portion disposed on the base portion, the hanger part is connected to the base portion opposite to the first locking portion and the second locking portion, the engagement structure has a third locking portion, a first passage formed beside the third locking portion, a fourth locking portion, and a second passage formed beside the fourth locking portion, the first locking portion is capable of passing through the first passage to be engaged with the third locking portion, the second locking portion is capable of passing through the second passage to be engaged with the fourth locking portion, the first locking portion has a positioning recess, the engagement structure has a positioning pillar at the third locking portion, and when the first locking portion is engaged with the third locking portion, the positioning pillar is locked in the positioning recess.

17. The supporting stand of claim 14, wherein the object-fixing structure is disposed opposite to the engagement structure on the support member.

* * * * *